US008283889B2

(12) United States Patent
Osswald et al.

(10) Patent No.: US 8,283,889 B2
(45) Date of Patent: Oct. 9, 2012

(54) CHARGING DEVICE WITH AN INTERCHANGEABLE BATTERY FOR A POWER TOOL

(75) Inventors: Alexander Osswald, Stuttgart (DE); Ursula Schmid, Stuttgart (DE); Klaus Dengler, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 706 days.

(21) Appl. No.: 12/163,000

(22) PCT Filed: Jul. 12, 2007

(86) PCT No.: PCT/EP2007/057144

§ 371 (c)(1),
(2), (4) Date: Aug. 1, 2008

(87) PCT Pub. No.: WO2008/031653

PCT Pub. Date: Mar. 20, 2008

(65) Prior Publication Data

US 2009/0027005 A1 Jan. 29, 2009

(30) Foreign Application Priority Data

Sep. 11, 2006 (DE) ........................ 10 2006 042 603

(51) Int. Cl.
*H02J 7/00* (2006.01)

(52) U.S. Cl. ....................................... 320/115; 320/113

(58) Field of Classification Search .................. 320/113, 320/115, 107, 128, 134, 136
See application file for complete search history.

(56) References Cited

U.S. PATENT DOCUMENTS

| | | | | |
|---|---|---|---|---|
| 6,066,938 | A * | 5/2000 | Hyodo et al. | 320/114 |
| 6,883,621 | B1 | 4/2005 | Lin | |
| 7,723,952 | B2 * | 5/2010 | Phillips et al. | 320/114 |
| 2006/0001404 | A1 | 1/2006 | Ziegler et al. | |
| 2006/0022646 | A1 | 2/2006 | Moore et al. | |
| 2007/0096687 | A1 | 5/2007 | Fuchs | |

FOREIGN PATENT DOCUMENTS

| | | | |
|---|---|---|---|
| DE | 34 02 331 | | 7/1985 |
| DE | 101 07 697 | | 9/2002 |
| DE | 10 2004 040 922 | | 3/2006 |
| EP | 1 612 907 | | 1/2006 |
| GB | 2 420 031 | | 5/2006 |
| WO | WO2006021468 | * | 3/2006 |

* cited by examiner

*Primary Examiner* — Richard V Muralidar
(74) *Attorney, Agent, or Firm* — Michael J. Striker

(57) ABSTRACT

A charging device (10, 100) includes a charging unit (12) and at least one interchangeable, rechargeable energy storage unit (14), in particular an interchangeable battery (18), of a power tool (16). Each energy storage unit (14) has first contact means (24) for contacting the corresponding power tool (16) and additional contact elements (38) for contacting the charging unit (12) in such a way that the charging unit (12) is able to charge the energy storage unit (14) via the additional contact elements (38), both when the unit is connected to the power tool (16) and when it is disconnected from the power tool (16).

8 Claims, 2 Drawing Sheets

CHARGING DEVICE WITH AN INTERCHANGEABLE BATTERY FOR A POWER TOOL

CROSS-REFERENCE

The invention described and claimed hereinbelow is also described in PCT/EP2007/057144, filed on Jul. 12, 2007 and DE 10 2006 042 603.7, filed on Sep. 11, 2006. This German Patent Application, whose subject matter is incorporated here by reference, provides the basis for a claim of priority of invention under 35 U.S.C. 119 (a)-(d).

BACKGROUND OF THE INVENTION

The invention relates to a charging device including a charging unit and at least one interchangeable, rechargeable energy storage unit of a power tool.

The use of power tools with rechargeable, interchangeable energy storage units, in particular interchangeable batteries, for a wide variety of purposes has been known for a long time. In devices of this kind, the energy storage unit is as a rule plugged into a receptacle provided for this in a grip of the power tool; an energy supply to the power tool occurs via contact means provided for this purpose. One example of a power tool of this kind is the cordless drill disclosed in GB-A-2 420 031, in which a battery pack composed of a plurality of rechargeable cells is detachably connected to the grip. The battery pack has a contact means embodied in the form of a shaft provided with electrical contacts, which can be used to produce an electrical connection to an electrical circuit contained in the cordless drill or in a charging unit via corresponding electrical contacts of the cordless drill or charging unit. The contact means also enables a communication between the battery pack and the cordless drill or the charging unit. To this end, the battery pack is equipped with a microprocessor that stores certain operating parameters of the battery pack such as the charge state or the temperature measured by means of a sensor integrated into the battery pack and sends these parameters to the cordless drill or charging unit for further evaluation.

SUMMARY OF THE INVENTION

The invention relates to a charging device including a charging unit and at least one interchangeable, rechargeable energy storage unit—in particular an interchangeable battery—of a power tool in which each energy storage unit has first contact means for contacting the corresponding power tool. According to the invention, each energy storage unit has additional contact means for contacting the charging unit in such a way that the charging unit is able to charge the energy storage unit via the additional contact means both when the storage unit is connected to the power tool and when it is disconnected from the power tool. This advantageously enables a charging of one or more energy storage units without having to first remove them from their respective power tools. It is likewise possible to charge the energy storage units separately, i.e. without their respective power tools.

In an advantageous embodiment, each energy storage unit has a sensor for emitting a sensor signal relating to the respective energy storage unit; the sensor signal can be evaluated both by the respective power tool and by the charging unit. To that end, the sensor signal can be conveyed to the power tool via the first contact means of the respective energy storage unit and can be conveyed to the charging unit via the additional contact means.

The respective power tool advantageously has an evaluation and detection means, which detects from the sensor signal whether the charging unit is currently charging the energy storage unit connected to the power tool. It is thus possible to eliminate an expensive and complex multiplexer that switches between the individual power tools and the charging unit. In this context, the sensor signal can, for example, be a temperature signal or a current signal of a sensor embodied in the form of a temperature-dependent resistor. Alternatively, it is also possible for the sensor to be a resistor, a capacitor, a coil, or the like for emitting the sensor signal in the form of a voltage or current signal.

If the evaluation and detection means of the respective power tool detects that a charging procedure is currently occurring, then it does not evaluate the sensor signal. In this case, a starting of the power tool is also prevented in order to increase operational safety. If, however, the energy storage unit connected to the power tool is not currently being charged, then an evaluation of the sensor signal by the evaluation and detection means of the respective power tool takes place and the power tool can be started. Safety can be further increased if with each measurement procedure, the evaluation and detection means of the respective power tool carry out a test of whether the charging unit is currently charging the energy storage unit connected to the power tool.

In an alternative embodiment, the charging unit interrupts the evaluation of the sensor signal for a definite time interval. The evaluation and detection means of the respective power tool advantageously detects the interruption of the evaluation of the sensor signal by the charging unit and evaluates the sensor signal during the definite time interval. In addition, the charging unit assigns each energy storage unit of a power tool connected to the charging unit its own definite time interval during which the evaluation and detection means of the respective power tool evaluates the sensor signal of the energy storage unit connected to it. After the definite time interval has ended, the charging unit continues the evaluation of the sensor signal again.

In an advantageous embodiment, the first and/or additional contact means of the energy storage unit and the corresponding contact means of the power tool and/or of the charging unit function in a contactless fashion, in particular inductively, at least for the transmission of the sensor signal. This makes it possible to effectively counteract a mechanical wear on the contact means or a corrosion of them.

BRIEF DESCRIPTION OF THE DRAWINGS

The invention will be explained by way of example below in conjunction with FIGS. 1 through 3; reference numerals that are the same from one drawing to the next indicate equivalent components with equivalent functions. The figures in the drawings, their description, and the claims contain numerous defining characteristics in combination. A person skilled in the art will also consider these defining characteristics individually and will unite them to form other meaningful combinations. In particular, the person skilled in the art will also unite the defining characteristics from different exemplary embodiments to form other meaningful combinations.

DETAILED DESCRIPTION OF THE PREFERRED EMBODIMENTS

Figure 1:
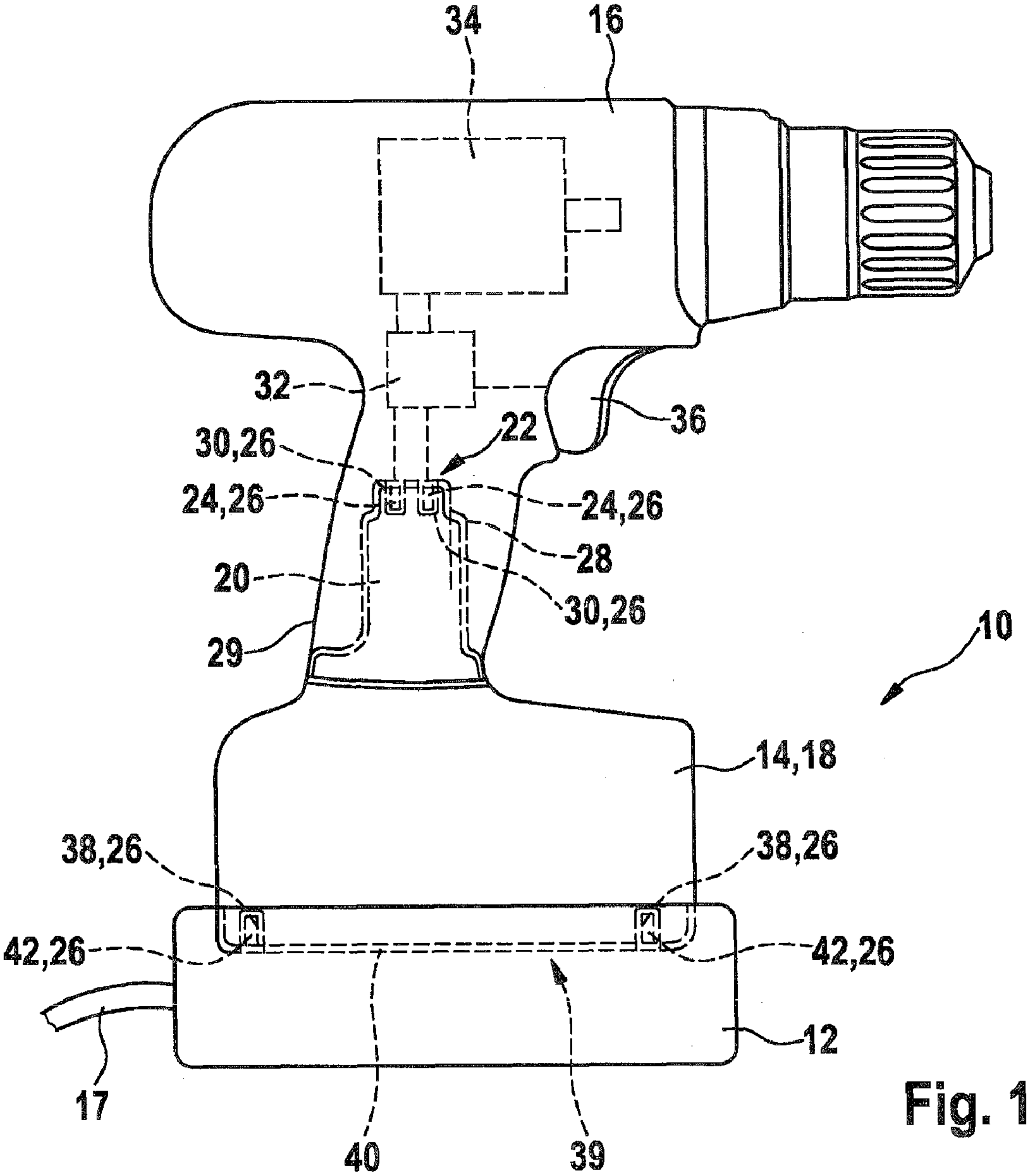
FIG. 1 is a side view of an exemplary embodiment for the charging device according to the invention.

FIG. 1 shows a charging device 10 that includes a charging unit 12 and at least one interchangeable, rechargeable energy storage unit 14 of a power tool 16. For a supply of energy, the charging unit 12 is connected, for example, via a power line 17 to a power grid that is not shown. The power tool 16 in the exemplary embodiment shown is embodied in the form of a cordless screwdriver or cordless drill, whose electromechanical design need not be discussed in greater detail. The invention can, however, also be used without limitation in all other correspondingly suitable battery-operated power tools including cordless grinders, cordless lamps, cordless staple guns, cordless saws, or the like. The interchangeable, rechargeable energy storage unit 14 is embodied in the form of an interchangeable battery 18 composed of one or more nickel cadmium, nickel metal hybrid, lithium-ion, or comparable rechargeable cells. Another conceivable option for the embodiment of the rechargeable energy storage unit 14 would also be a capacitor or an arrangement of a plurality of capacitors in a parallel and/or series circuit. The discussion below, however, will center exclusively on an interchangeable battery 18.

The interchangeable battery 18 is detachably connected to the power tool 16. For this purpose, it is provided in a known fashion with detent means, not shown, which engage in corresponding recesses, also not shown, of the power tool 16. A wide variety of possibilities for detent connecting the interchangeable battery 18 to the power tool 16 are known to those skilled in the art, rendering it unnecessary to give a detailed description of them. The interchangeable battery 18 has a shaft 20 whose upper end 22 has first contact means 24 mounted on it, for example in the form of electrical spring contacts 26 or the like. To provide mechanical stability, the shaft 20 engages in a receptacle 28 of a grip 29 of the power tool 16. This produces an electrical connection of the first contact means 24 of the interchangeable battery 18 to correspondingly embodied contact means 30 of the power tool 16 that can likewise be embodied in the form of electrical spring contacts 26, contact pins, or the like. This electrical connection enables an electric motor 34 of the power tool 16 to be supplied with energy via a set of electronics 32 integrated into the power tool 16 as a function of a switch or button mechanism 36. In addition to the transmission of energy, though, the first contact means 24 of the interchangeable battery 18 also enable the transmission of additional signals for the monitoring of the interchangeable battery 18, which will be discussed in greater detail below.

For contacting with the charging unit 12, the lower end 39 of the interchangeable battery 18 is provided with additional contact means 38, which, like the first contact means 24, can be embodied in the form of spring contacts 26. For the charging procedure, the interchangeable battery 18 is placed or slid into a corresponding receptacle 40 of the charging unit 12, and is optionally connected to the latter in detent fashion. In this case, the additional contact means 38 of the interchangeable battery 18 come into an electrical connection with corresponding contact means 42 of the charging unit 12, which in turn can be embodied in the form of electrical spring contacts 26 or the like, in order to supply energy to the interchangeable battery 18. The charging procedure of the interchangeable battery 18 then occurs automatically immediately after it is placed, laid, or inserted into the receptacle 40 or immediately after actuation of a switch or button mechanism that is not shown. Like the first contact means 24, in addition to the transmission of energy, the additional contact means 38 also enable a transmission of additional signals for the monitoring of the interchangeable battery 18.

The expressions "lower end" and "upper end" of the interchangeable battery 18 and shaft 20 relate to the usual operating attitude of the power tool 16 when held by the grip 29. The first and additional contact means 24 and 38 of the interchangeable battery 18 can, however, also be provided at other suitable locations. In this connection, the important factor is that the additional contact means 38 enable the interchangeable battery 18 to be charged both when it is connected to the power tool 16, i.e. in the inserted state, and when it is disconnected from the power tool 16, i.e. in the removed state.

Figure 2:
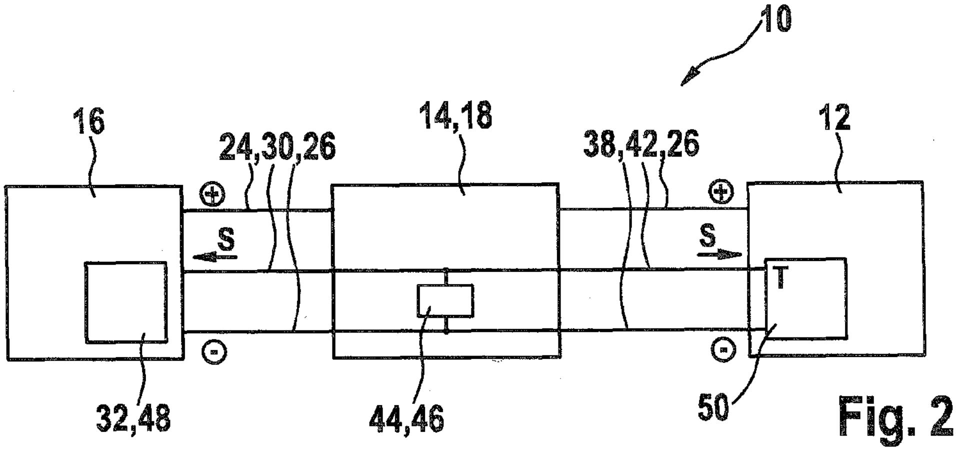
FIG. 2 is a schematic block circuit diagram of the charging device according to the invention shown in FIG. 1.

FIG. 2 is a schematic block circuit diagram of the exemplary embodiment according to FIG. 1. The two outer blocks respectively symbolize the charging unit 12 and the power tool 16, whereas the middle block corresponds to the energy storage unit 14 or interchangeable battery 18. While the interchangeable battery 18 contacts the power tool 16 in the above-described fashion via first the contact means 24 of the interchangeable battery 18 and the corresponding contact means 30 of the power tool 16, an electrical contact between the interchangeable battery 18 and the charging unit 12 is produced via the additional contact means 38 of the interchangeable battery 18 and the corresponding contact means 42 of the charging unit 12. The number of contact means in this case depends on the respective application. In the exemplary embodiment shown, between the individual units (power tool 16, interchangeable battery 18, charging unit 12), three respective contact means are used per unit. In this instance, the respective outer contact means are used for energy transmission, i.e. as the power or ground connection (indicated by a "+" or "−" sign with a circle around it), while the middle contact, in connection with the lower contact means, enables the transmission of a sensor signal S of a sensor 44 integrated into the interchangeable battery 18. The terms "outer," "middle," and "lower contact means" refer merely to the depiction in FIG. 2 and are not intended to provide information about the actual arrangement of the respective units.

If the sensor 44 is a temperature-dependent resistor 46, for example a resistor with a negative temperature coefficient (NTC), then the sensor signal S emitted by it is a temperature signal or a voltage signal that can be evaluated by both the charging unit 12 and the power tool 16.

This temperature or voltage signal is used for monitoring the state of the interchangeable battery and for avoiding overheating or other damage to the interchangeable battery. In lieu of an NTC, it is also possible for the sensor 44 to be embodied in the form of a normal resistor (shunt), a capacitor, a coil, or the like in order to emit the sensor signal S in the form of a voltage or current signal; in this case, too, the sensor signal S makes it possible to monitor the state of the interchangeable battery.

On the basis of the sensor signal S, the power tool 16, through the use of an evaluation and detection means 48 integrated into the electronics 32, is now able to detect whether the charging unit 12 is currently charging the interchangeable battery 18 connected to the power tool 16. To that end, the evaluation and detection means 48 evaluates the temperature or voltage signal, for example, in such a way that a definite temperature or voltage change permits it to detect that a charging procedure is currently occurring. If such an ongoing charging procedure is detected, then the evaluation and detection means 48 interrupts the evaluation of the sensor signal S so that the evaluation can take place by means of a corresponding set of evaluation and control electronics 50 of the charging unit 12. In this case, a starting of the power tool 16 by means of the switch or button mechanism 36 is also advantageously prevented in order to assure operational safety. But if the evaluation and detection means 48 of the power tool 16 detects that no charging of the interchangeable battery 18 is currently occurring, then it evaluates the sensor signal S in order to continue testing the state of the interchangeable battery. Such a testing process advantageously takes place with each measurement procedure or with each actuation of the switch or button mechanism 36.

An alternative possibility for evaluating the sensor signal S by means of the charging unit 12 and power tool 16 is comprised of a charging unit-initiated interruption of the evaluation by the charging unit 12 and its evaluation and control electronics 50 for a definite time interval T, for example 30 seconds. As a result of a corresponding temperature, voltage, or current change of the sensor signal S emitted by the sensor 14, the evaluation and detection electronics 48 of the power tool 16, in which, for example, a certain reference value is stored, detect this interruption, thus enabling the evaluation and detection electronics 48 to evaluate the sensor signal S from that point on for the definite time interval T. After the definite time interval T has ended, the evaluation then takes place once again by means of the evaluation and control electronics 50 of the charging unit 12.

Figure 3:
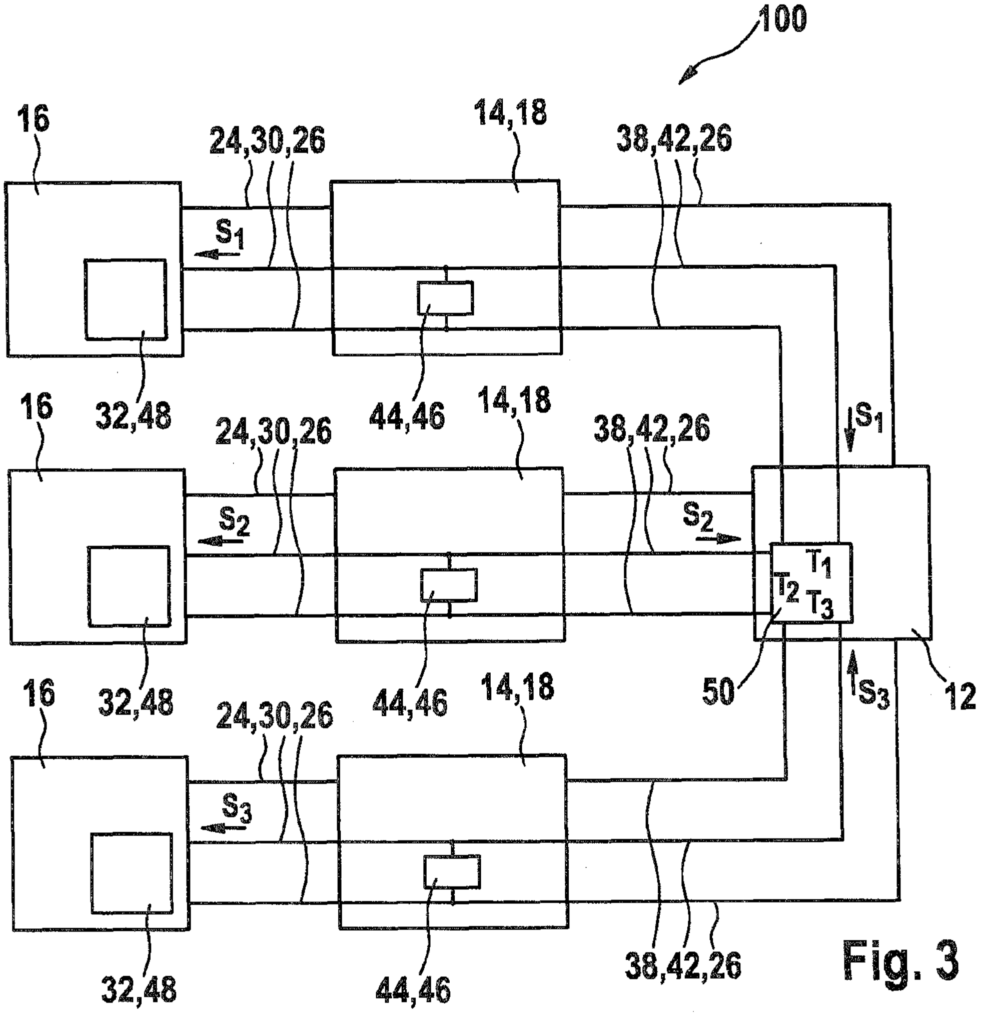
FIG. 3 is a schematic block circuit diagram of another exemplary embodiment of the charging device according to the invention.

FIG. 3 shows another exemplary embodiment of a charging device 100 according to the invention. It differs from the charging device 10 shown in FIG. 2 only by means of the plurality of interchangeable batteries 18 of the respective power tools 16 to be charged by the charging unit 12; the number of three power tools 16 shown in FIG. 3 is understood to be nonlimiting and is intended merely to serve an example. Since both the function and the individual components of the charging device 100 essentially correspond to those according to FIG. 2, they need not be described in detail again.

The evaluation and control electronics 50 of the charging unit 12 are now laid out in such a way that they assign each power tool 16 its own definite time interval $T_1$, $T_2$, $T_3$ during which the evaluation and detection electronics 48 of the respective power tool 16 evaluate the corresponding sensor signal $S_1$, $S_2$, $S_3$ emitted by the sensor 44 of the interchangeable battery 18 connected to it. The individual time intervals $T_1$, $T_2$, $T_3$ here can be of equal lengths or can be of different lengths, for example as a function of the respective charge state or sensor signal $S_1$, $S_2$, $S_3$ of the corresponding interchangeable battery 18. If the respective time interval $T_1$, $T_2$, $T_3$ has ended, then the evaluation of the sensor signals $S_1$, $S_2$, and $S_3$ once again takes place by means of the charging unit 12.

The charging device 100 according to the invention consequently enables an evaluation of a plurality of sensor signals without the use of a multiplexer that would have to be used to switch between the individual interchangeable batteries 18 and the sensors 44 integrated into them. In addition, is also possible fore there to be a pure detection of other measurement circuits, i.e. evaluation and detection means and electronics, without the necessity for an evaluation of the sensor signals.

It should also be noted in conclusion that the exemplary embodiments shown are limited to neither the depictions in FIGS. 1 through 3 nor to the values of the time intervals mentioned nor to the number of interchangeable batteries mentioned that are to be charged and monitored. As has already been explained above, the contact means 24, 30, 38, 42 can be embodied as electrical spring contacts 26. On the other hand, is also conceivable for the first and/or additional contact means 24 and 38 of the interchangeable battery 18 and the corresponding contact means 30 and 42 of the power tool 16 and/or of the charging unit 12 to function in a contactless fashion, in particular inductively, at least for the transmission of the sensor signals S, $S_1$, $S_2$, $S_3$. Furthermore, the embodiment of the interchangeable battery 18 with the shaft 20 is intended merely to serve as an example. Naturally, the invention can also be used for interchangeable batteries embodied in other ways.

What is claimed is:

1. A charging device (10, 100) of a power tool (16), comprising:

a charging unit (12); and at least one interchangeable, rechargeable energy storage unit (14), in the form of an interchangeable battery (18), in which each energy storage unit (14) has first contact means (24) for contacting the corresponding power tool (16), wherein each energy storage unit (14) has additional contact means (38) for contacting the charging unit (12) in such a way that the charging unit (12) charges the energy storage unit (14) via the additional contact means (38), both when the energy storage unit (14) is connected to the power tool (16) and when the energy storage unit (14) is disconnected from the power tool (16), wherein each energy storage unit (14) has a sensor (44) emitting a sensor signal (S, $S_1$, $S_2$, $S_3$) relating to the energy storage unit (14) and evaluated by both the power tool (16) and the charging unit (12), with each of said emitting of the sensor signal and evaluation of the sensor signal performed with a measurement procedure, wherein the first contact means (24) of the respective energy storage unit (14) convey the sensor signal (S, $S_1$, $S_2$, $S_3$) to the power tool (16) and the additional contact means (38) convey the sensor signal (S, $S_1$, $S_2$, $S_3$) to the charging unit (12), and wherein the power tool (16) has an evaluation and detection means (48), which detects from the sensor signal (S, $S_1$, $S_2$, $S_3$) whether the charging unit (12) is currently charging the energy storage unit (14) connected to the power tool (16).

2. The charging device (10, 100) as recited in claim 1, wherein if a charging procedure is detected, then the evaluation and detection means (48) of the power tool (16) does not carry out an evaluation of the sensor signal (S, $S_1$, $S_2$, $S_3$).

3. The charging device (10, 100) as recited in claim 1, wherein the evaluation and detection means (48) of the power tool (16) evaluates the sensor signal (S, $S_1$, $S_2$, $S_3$) if the energy storage unit (14) connected to the power tool (16) is not currently undergoing a charging procedure.

4. The charging charging device (10, 100)as recited in claim 1, wherein with each measurement procedure, the evaluation and detection means (48) of the power tool (16) tests whether the charging unit (12) is currently charging the energy storage unit (14) connected to the power tool (16).

5. The charging device (10, 100) as recited in claim 1, wherein the charging unit (12) interrupts the evaluation of the sensor signal (S, $S_1$, $S_2$, $S_3$) for a definite time interval (T, $T_1$, $T_2$, $T_3$).

6. The charging device (10, 100) as recited in claim 5, wherein the evaluation and detection means (48) of the respective power tool (16) detects the interruption of the evaluation of the sensor signal (S, $S_1$, $S_2$, $S_3$) by the charging unit (12) and evaluates the sensor signal (S, $S_1$, $S_2$, $S_3$) during the definite time interval (T, $T_1$, $T_2$, $T_3$).

7. The charging device (10, 100) as recited in claim 5, wherein the charging unit (12) continues the evaluation of the sensor signal (S, $S_1$, $S_2$, $S_3$) once more after the definite time interval (T, $T_1$, $T_2$, $T_3$).

8. The charging device (10, 100) as recited in claim 1, wherein the charging unit (12) assigns each energy storage unit (14) of the power tool (16) that is connected to the charging unit (12) its own definite time interval ($T_1$, $T_2$, $T_3$) during which the evaluation and detection means (48) of the power tool (16) evaluates the sensor signal ($S_1$, $S_2$, $S_3$) of the energy storage unit (14) connected to it.

* * * * *